Figure 1:
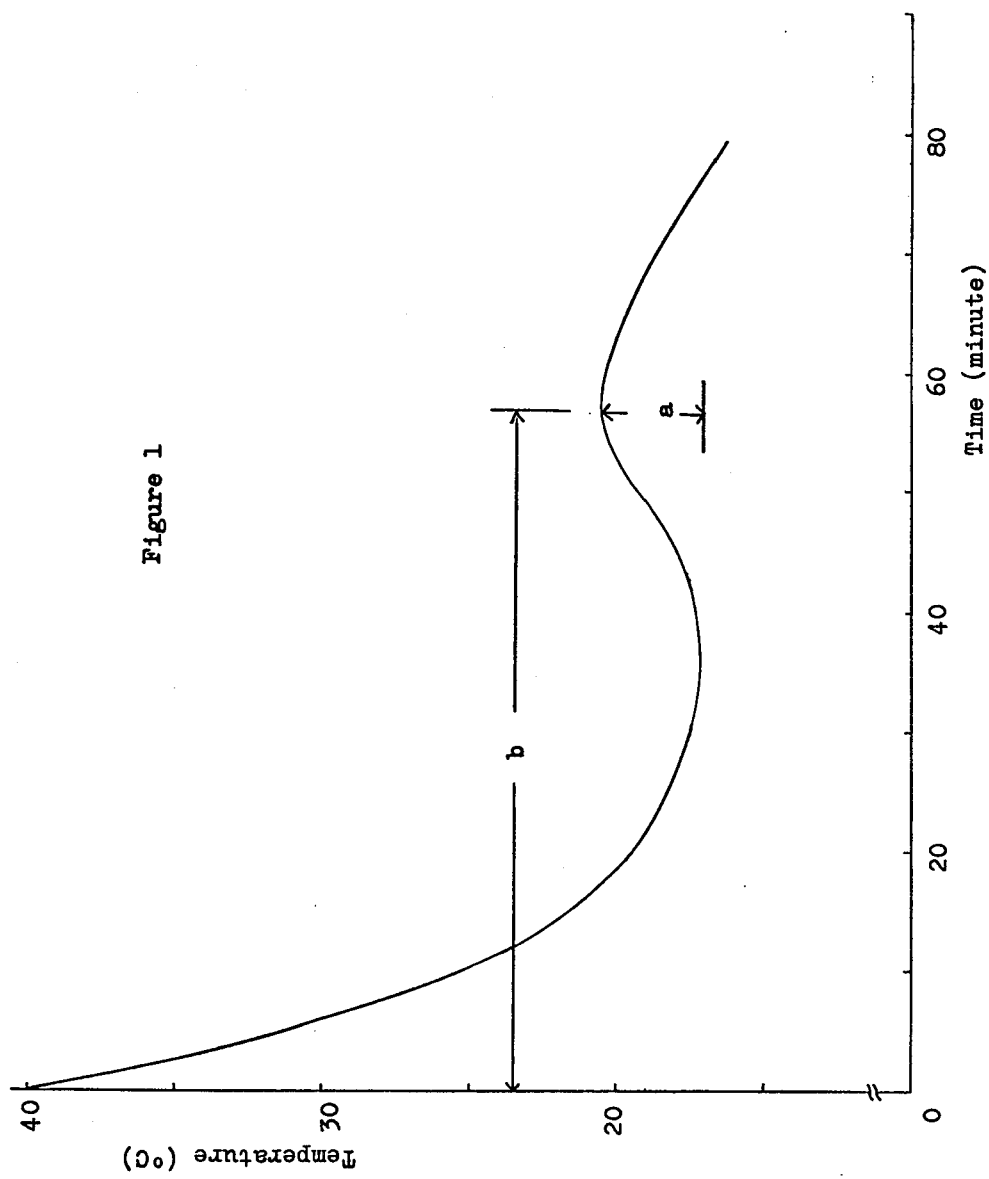

United States Patent [19]

Mandai et al.

[11] 4,103,039

[45] Jul. 25, 1978

[54] METHOD FOR PRODUCING IMPROVED SHEA FAT

[75] Inventors: Akio Mandai, Izumiotsu; Yoshinori Hirukawa, Sennan; Hayato Kubota, Izumi; Yukiya Iwanaga, Sennan, all of Japan

[73] Assignee: Fuji Oil Company, Limited, Osaka, Japan

[21] Appl. No.: 715,669

[22] Filed: Aug. 18, 1976

[51] Int. Cl.² ............................................. A23D 5/00
[52] U.S. Cl. .................................. 426/607; 260/428.5
[58] Field of Search ............... 426/607, 429, 479, 495; 260/428.5, 398, 405.5

[56] References Cited

U.S. PATENT DOCUMENTS

| | | | |
|---|---|---|---|
| 2,980,717 | 4/1961 | Cavanagh et al. | 260/428.5 |
| 3,012,891 | 12/1961 | Best et al. | 426/607 |
| 3,070,445 | 12/1962 | Sinnema | 426/607 |
| 3,171,748 | 3/1965 | Galenkamp | 426/607 |

*Primary Examiner*—Robert A. Yoncoskie
*Attorney, Agent, or Firm*—Birch, Stewart, Kolasch and Birch

[57] ABSTRACT

A method for producing improved shea fat suitable for hard butter, which comprises treating a raw shea fat with a lower aliphatic alcohol (e.g. ethanol, propanol or isopropanol), removing the alcohol-insoluble portion, cooling the remaining solution to separate into two layers, the upper layer being oil-poor and the lower layer being oil-rich, and collecting the latter oil-rich layer, said lower layer being usually subjected to a solvent fractionation with n-hexane, acetone or methyl ethyl ketone. The improved shea fat is admixed with an intermediate fraction of palm oil to give the desired hard butter having superior tempering properties.

5 Claims, 3 Drawing Figures

METHOD FOR PRODUCING IMPROVED SHEA FAT

BACKGROUND AND SUMMARY OF THE INVENTION

The present invention relates to a method for producing an improved shea fat suitable for a hard butter.

It is well known that a shea fat is used as cacao butter substitute. For this purpose, the shea fat has been used as it is in a few cases, but in most cases, it has been fractionated with an aliphatic ketone such as acetone or methyl ethyl ketone into two portions, one being a hardlysoluble portion consisting of some impurities such as karitene and another one being a readily-soluble portion mainly consisting of certain unsaturated glycerides, in particular, SOS (stearyl-oleyl-stearyl-triglyceride). The latter fraction is used as a cacao butter substitute as it is, or in the form of a mixture with an intermediate fraction of palm oil (hereinafter, referred to as "palm mid-fraction") with or without further fractionation (cf. British Patent Specification No. 925,805). However, such hard butters generally are inferior in the tempering properties upon chocolate-making when they are admixed with the conventional ingredients for chocolate such as cacao butter, milk, sugar, etc. This defect is particularly remarkable when a considerably large amount of the above palm midfraction is used, or when fatty ingredients different from those of the cacao butter, such as a milk fat as in a milk chocolate, are additionally used. As is generally known in this field, in the standardized chocolate industries at the present time, there has customarily been used an automatic tempering apparatus in which the raw materials are automatically subjected to a predetermined temperature/timetreatment and then poured into a shaping mold. In this automatic process, it is required to control the temperature during the treatment, wherein the raw materials are cooled to a crystallizing temperature from the higher melting temperature and are again warmed to a slightly higher pouring temperature. Moreover, it is also required that the raw materials themselves are to have a workable viscosity as low as possible, even at the tempering temperature which is the lowest temperature during the above heat treatment and further to have a sufficient temperature difference between said tempering temperature and a critical temperature which means the highest temperature at which the viscosity of the materials increases so high as to make the practicing of the process impossible. If this temperature difference is too small, it is necessary to control the working temperature very precisely over its automatically controllable range, and further, even if such a control has been made, the separation of the molded chocolates from the shaping mold often becomes difficult. Another problem in the conventional shea fat is that shea nuts from which the shea fat is extracted easily deteriorate during the storage thereof. As is well known, the quality of the shea fat becomes markedly worse when the shea nuts are kept for a long period of time after the crop is harvested because of the auto-hydrolysis of neutral oils and fats contained in the nuts or because of the complicated chemical changes of the isoprene polymer components thereof, and therefore, the hard butters prepared from such deteriorated shea nuts are mostly undesirable for confectionaries. Since this deterioration initiates so soon after the nuts have been cropped, it occurs more or less before pressing. In particular, the shea fat pressed out from the old crop will be only slightly refined, which causes a great problem in the production thereof.

Moreover, it is a significant problem in this field that the conventional hard butters composed of a mid-fraction of shea fat fractionated with a ketonic solvent and the palm mid-fraction have inferior tempering properties. This reason has not been made clear but it is assumed that the inferior tempering properties thereof may be caused by the aforementioned complicated deterioration of the nuts, by which an unknown tempering hindrance factor (hereinafter referred to as "THF") is accumulated in the nuts as the deterioration proceeds. We have found that this undesirable THF can be eliminated from the crude fats according to the present invention.

It has hitherto been considered that the impurities in shea fat are karitene which is a polyisoprene compound with an unknown chemical structure, terpenes and sterols. Among them, karitene can mostly be removed by a fractional crystallization since it is hardly soluble in the aforesaid ketonic solvents, while the latter two impurities can also be separated from the intermediate fraction mainly consisting of stearyl-oleyl-stearyl-triglyceride since they are very easily soluble in the ketonic solvents. However, we have found that the conventional shea fat contains a further impurity: THF which badly influences the tempering in the intermediate fraction of the shea fat fractionated in a usual manner, and the removal of this factor is economically impossible so long as the usual refining method is utilized. The present invention provides an economical method for removing THF in the shea fat.

The main object of the present invention is to provide a method for producing an improved shea fat suitable for a hard butter superior in its tempering properties by an economical process. Another object of the present invention is to make possible the use of aliphatic hydrocarbon solvents such as n-hexane, which are permitted as food additives by the Food and Drug Administration, but have heretofore been regarded as improper for the fractionation of shea fat. A further object of the present invention is to improve the tempering properties of the shea fat derived from deteriorated shea nuts. A still further object of the present invention is to make possible the omission or simplification of the usual deacidification step and further to make easy the refining of shea fat. These and other objects and advantages of the present invention will be appearent from the following description.

As a result of extensive studies on the refining manners of shea fat, the inventors have now found that the THF will be included in the fraction which is easily soluble in lower aliphatic alcohols (hereinafter referred to as the "alcohols"). Based on this finding, it has been found that the improved shea fat can be produced by removing the easily-alcohol-soluble portion of the shea fat by treating it with alcohols.

Heretofore, it has been known to fractionate crude shea fat for the production of the fat for soap-making, by treating with boiling ethanol, removing the insoluble materials by decantation, and cooling the resulting solution to separate it into only slightly soluble or insoluble portions and readily-soluble portions (Bull. Mens. Inform. IPERG 7, 395–6, 1958). However, according to our investigations (refer to the aftergoing Comparative Example 1), the yield of the crystalline portion obtained by this fractionation was only 51% by weight, and it showed a high iodine value of 47 and its coagulation properties (cooling curve) were also not improved. If such fractionated fat were used for chocolate-making, there would be required a very precise temperature control of the tempering process and the chocolate thus produced would be unsatisfactory in its snapping property which is the life-line of chocolates.

The method of the present invention comprises a combination of the following steps. At first, the raw shea fat and alcohols are mixed together. The alcohols is used in an amount enough to completely dissolve the neutral oils and fats and further almost sufficient to separate out the alcohols-insoluble ingredients in the shea fat. This amount varies depending on the kinds of alcohols used, but for example, in case of an ethanol having a concentration of 85% by weight or higher, it is used in a range of 1 to 20 parts by weight to 1 part by weight of the shea fat. The use of larger amounts of ethanol is not economical. So-called "denatured ethanol" which is contaminated with a small amount of hexane may also be used instead of pure ethanol. The alcohol mixture is then heated and allowed to stand at the same temperature in order to remove the precipitated alcohol-insoluble materials. Next, the mother liquor is cooled to separate into the oil-poor upper layer (alchohlic phase) and the lower layer (oily phase), and then the latter is collected by flowing down. Besides, the former (the alcholic layer) can be repeatedly used for the following refining process without distillation, but limitless recycling of this layer will cause a decrease in the effect of the refining because of the accumulated free fatty acids and THF therein. Therefore, it is preferable to remove a part of the alcoholic layer from the system continuously or from time to time in a predetermined interval. The amount of the alcoholic layer to be removed should be determined according to the cooling curves of the final products, however, usually it is 5 to 20% by weight of the alcohols used in each refining procedure. Of course, if an undeacidified shea fat is used as the raw material, a larger amount of it should be removed.

It is preferable to lower the cooling temperature as low as possible for separating the alcoholic layer and the oily layer, since the lower the temperature, the less the solubility of oils and fats in the alcohols. But, generally speaking, a range of 20° to 60° C is preferable. As the alcohols, propanol, isopropanol and so on may be used as well as ethanol.

The lower oil-rich layer obtained above is then subjected to a conventional solvent fractionation process. That is, the lower layer is dissolved in an organic solvent (e.g. n-hexane, acetone or methyl ethyl ketone) and the resulting crystalline portion is separated by filtration to give the desired improved shea fat.

The present invention may be more fully understood by referring to the following examples and comparative examples which are intended to clarify the effect of the present invention. In all experiments, the mixture comprising the shea fat fraction and the palm mid-fraction was used since the defect of shea fat is more clear in the co-presence of the palm mid-fraction. And further, the tempering properties were evaluated by the measurement of each sample's cooling curve which is the standard method used in this field for evaluating whether the tempering properties are good or not. This measurement was carried out as follows:

The sample was heated to 80° C and then filtered with a filter paper. The filtered sample (12 ± 0.5 g) was then put into an inner tube (inner diameter: 16.5 mm) which was intermittently set in an outer tube (inner diameter: 30 mm, length: 155 mm) with a proper rubber stopper. The tubes were kept at 60° C for 30 minutes and thereafter dipped into a water-thermostat kept at 12 ± 0.2° C. The temperature of the sample was measured with a platinum thermo-couple (ET 2,200 type, made by Chino Seisakusho; diameter: 2 mm, length: 200 mm) which was inserted into the midst of the inner tube and was connected with lead-lines to an automatic temperature recorder (the recorder was of a dotting type having a recordable range of 10°–40° C (6 dots per minute). The recording was started immediately after the tubes were dipped into the thermostat.

We have found as a result of our long investigation as to hard butter the following:

Namely, FIG. 1 shows an explanatory standard cooling curve of cacao butter. In the curve, a numeral (a) means the time (minutes) elapsed until the temperature once has dropped down from the initial point (40° C) to the lowest point and then ascended to the peak point, and another numeral (b) means the difference between the peak and the bottom temperature. According to our investigations, the usable and preferred ranges of the numerals (a) and (b) are as shown in the following table 1.

Table 1

| | Usable range | Preferred range | Cacao butter |
|---|---|---|---|
| a(° C) | 1.5–5.0 | 3.0–5.0 | 3.5 |
| b(min.) | 45–75 | 45–60 | 56 | in the following Examples, "part" and "%" are shown by weight unless specified otherwise.

EXAMPLE 1

A deacidified shea fat (1,000 parts) was mixed with a 93% ethanol (4,000 parts) which was denatured with a 3% n-hexane. The mixture was vigorously agitated at 120° C for 10 minutes and allowed to stand at the same temperature for 20 minutes. The ethanol-insoluble portion precipitated was removed and the filtrate (the ethanol-soluble portion) was cooled to 40° C to give two phases: the ethanolic phase containing 3.2% of oil (3,951 parts) as the upper layer and the oily phase containing 84.0% of oil (992 parts) as the lower layer, from which the solvent was removed. The products obtained above have the following properties.

Table 2

| | | Acid value | Iodine value | Saponification value | Yield(%) |
|---|---|---|---|---|---|
| Raw shea fat | | 2.36 | 63.5 | 177.5 | |
| Ethanol-insoluble portion | | 1.0 | 215.5 | 90.0 | 4.0 |
| Ethanol-soluble portion | Upper layer | 17.0 | 63.1 | 174.3 | 12.7 |
| | Lower layer | 0.63 | 55.1 | 183.7 | 83.8 |

The lower oily portion was completely dissolved in n-hexane (300 parts), cooled to −15° C and gently agitated for 1 hour. The precipitated crystals were separated by filtration, and the solvent was removed from the filtrate. The crystalline portion and the filtrate thus obtained have the following properties.

Table 3

| | Iodine value | Saponification value | Yield(%) |
|---|---|---|---|
| Crystalline portion | 40.1 | 185.3 | 55 |

Table 3-continued

|  | Iodine value | Saponification value | Yield(%) |
|---|---|---|---|
| Filtrate | 73.0 | 177.0 | 45 |

Separately, a deacidified palm oil (100 parts) was dissolved in methyl ethyl ketone (400 parts), and the mixture was cooled to 20° C and agitated for 1 hour. The crystalline suspension thus formed was filtered to remove the high-melting crystals and the filtrate was further cooled to 3° C to separate into the middle melting crystalline portion and the remaining filtrate. The solvent was removed from the above three fractions, respectively. These products have the following properties.

Table 4

|  | Iodine value | Saponification value | Yield(%) |
|---|---|---|---|
| High melting portion | 10.0 | 203 | 9.5 |
| Middle melting portion | 37.5 | 198.5 | 26.0 |
| Low melting portion | 64.8 | 197.8 | 64.5 |

Figure 2:
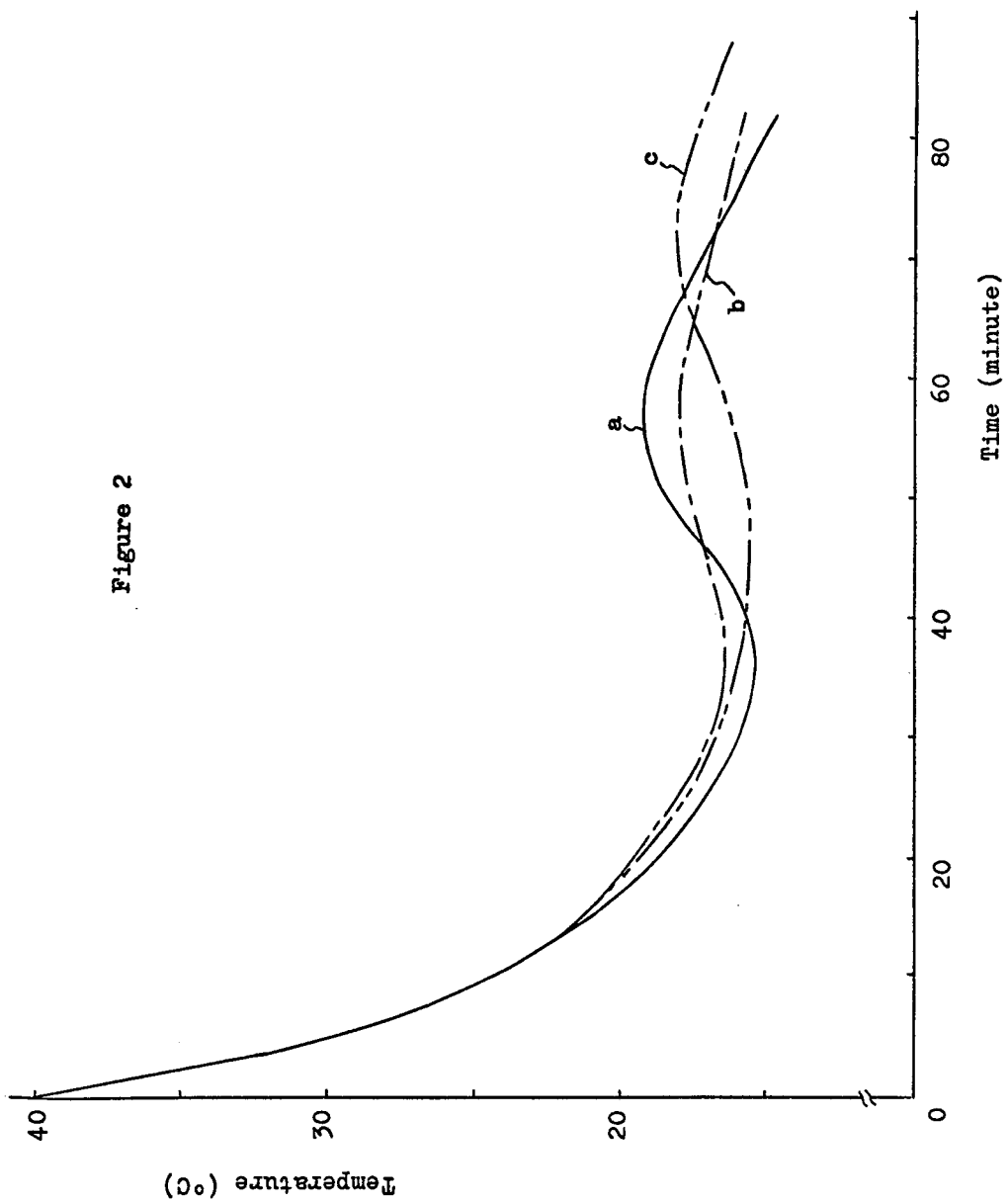

The middle melting portion thus obtained (i.e. the palm mid-fraction) (40 parts) was mixed with the crystalline portion (60 parts) obtained in Example 1 and the mixture was subjected to the cooling curve measurement. The data are shown in FIG. 2(a), wherein the numerals (a) and (b) were 3.7 and 57, respectively.

COMPARATIVE EXAMPLE 1

The deacidified shea fat (100 parts) according to Example 1 was mixed with 99.5% ethanol (2,400 parts), and the mixture was boiled and then allowed to stand at 80° C for 210 minutes to precipitate the ethanol-insoluble portion. Thereafter, this insoluble portion was removed by decantation and the solution was stirred at 10° C for 1 hour, and the precipitated crystals were separated by fractionation. These products have the following properties.

Table 5

|  | Iodine value | Saponification value | Yield(%) |
|---|---|---|---|
| Insoluble portion | 210 | 97.1 | 4.0 |
| Crystalline portion | 47.5 | 183.0 | 50.7 |
| Filtrate | 70.0 | 176.2 | 45.3 |

This crystalline portion (60 parts) was mixed with the palm mid-fraction (40 parts) according to Example 1. The cooling curve of this mixture is as shown FIG. 2(b), wherein the numerals (a) and (b) were 1.8 and 56, respectively.

COMPARATIVE EXAMPLE 2

The deacidified shea fat (1,000 parts) according to Example 1 was mixed with 95% methyl ethyl ketone (4,000 parts), and the mixture was agitated at 55° C, cooled to 23° C and then further stirred for 1 hour. The insoluble materials were removed and the solvent was evaporated off to give the insoluble portion (38 parts) and the soluble portion (962 parts). This soluble portion (100 parts) was dissolved well in n-hexane (300 parts) and stirred for 1 hour at −15° C, and filtered to give crystalline portion and filtrate, from which the solvent was removed. These products have the following properties.

Table 6

|  | Iodine value | Saponification value | Yield(%) |
|---|---|---|---|
| Crystalline portion | 39.8 | 184.8 | 55.1 |
| Filtrate | 71.7 | 177.8 | 44.9 |

This crystalline portion (60 parts) was then mixed with the palm mid-fraction (40 parts) in Example 1. The mixture shows the cooling curve as shown in FIG. 2(c) wherein the numerals (a) and (b) were 2.6 and 72, respectively.

EXAMPLE 2

The lower oily fraction (100 parts) from the ethanol-soluble portion according to Example 1 was dissolved enough in a 95% methyl ethyl ketone (400parts), and the mixture was cooled to 5° C and agitated for 1 hour. The crystals thus precipitated were collected by filtration. The solvent was removed from the filtrate. These products have the following properties.

Table 7

|  | Iodine value | Saponification value | Yield(%) |
|---|---|---|---|
| Crystalline portion | 41.0 | 184.7 | 56 |
| Filtrate | 72.8 | 177.3 | 44 |

Figure 3:
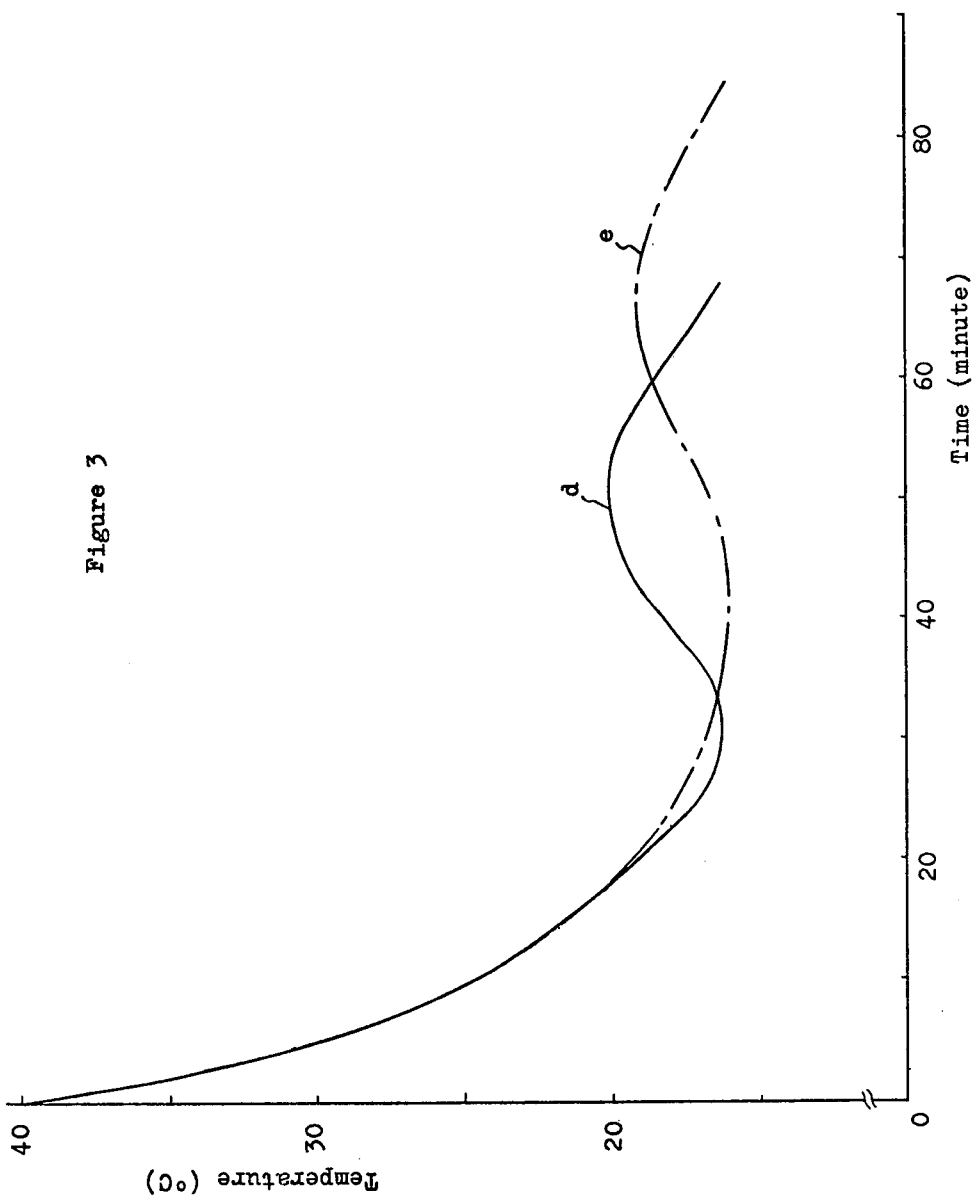

This crystalline portion was then mixed with the palm mid-fraction likewise. A cooling curve as shown in FIG. 3 (d) was obtained. The numerals (a) and (b) were 4.2 and 48, respectively.

COMPARATIVE EXAMPLE 3

The methyl ethyl ketone-soluble portion (100 parts) obtained in comparative Example 2 was dissolved enough in methyl ethyl ketone (400 parts), and the mixture was cooled to 5° C and then stirred for 1 hour to precipitate the crystals. The solvent was removed therefrom to give the following fractions.

Table 8

|  | Iodine value | Saponification value | Yield(%) |
|---|---|---|---|
| Crystalline portion | 40.5 | 184.0 | 57.3 |
| Filtrate | 72.5 | 177.8 | 42.7 |

This crystalline portion was mixed with the palm mid-fraction likewise. The cooling curve of the mixture is as shown in FIG. 3(e), wherein the numerals (a) and (b) were 3.0 and 66, respectively.

EXAMPLE 3

An undeacidified shea fat (1,000 parts) was mixed with the same 93% ethanol (6,000 parts) was used in Example 1, and the mixture was vigorously agitated at 120° C for 10 minutes and then allowed to stand at the same temperature for 20 minutes. The ethanol-insoluble portion thus precipitated was decanted and the remaining ethanol-soluble portion was then cooled to 40° C to separate into two phases: the upper layer (the oil content: 5.0%, 6,167 parts) and the lower layer (the oil content: 84.0%, 773 parts), from which the solvent was removed. These products have the following properties.

Table 9

|  | Acid value | Iodine value | Saponification value | Yield(%) |
|---|---|---|---|---|
| Raw shea fat | 35.0 | 63.8 | 177.0 |  |

Table 9-continued

|  |  | Acid value | Iodine value | Saponification value | Yield(%) |
|---|---|---|---|---|---|
| Ethanol-insoluble portion | | 8.5 | 200.5 | 91.0 | 4.2 |
| Ethanol-soluble portion | Upper layer | 97.0 | 60.5 | 174.7 | 31.0 |
| | Lower layer | 6.0 | 55.1 | 183.7 | 64.8 |

This lower ethanol-soluble portion was fractionated as in Example 1 with n-hexane. The products have the following properties.

Table 10

|  | Acid value | Iodine value | Saponification value | Yield(%) |
|---|---|---|---|---|
| Crystalline | 2.3 | 40.3 | 185.1 | 55.5 |
| Filtrate | 10.6 | 72.8 | 177.8 | 44.5 |

The crystalline portion was mixed with the palm mid-fraction and the mixture was also examined for the cooling curve, likewise. As the result, the numerals (*a*) and (*b*) were 3.6 and 55 respectively, which are similar to those of Example 1.

As clearly shown by the foregoing Examples and Comparative Examples, the fractionated shea fats according to the present invention show improved cooling curves as compared with those of the Comparative Examples (out of the invention).

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A method for producing an improved shea fat suitable for hard butter, which comprises heating a raw shea fat with ethanol having a concentration of at least 85% by weight ethanol in an amount of 1 to 20 parts by weight to 1 part by weight of the raw shea fat to a temperature to provide a mixture consisting of an alcohol insoluble portion and an alcohol soluble portion allowing the mixture to stand at the temperature of said heating for a time sufficient to allow the alcohol insoluble portion to separate, removing the alcohol-insoluble portion from the mixture at said temperature of heating, cooling the remaining solution to a temperature of 20° to 60° C, thereby causing said solution to separate into two separate and distinct liquid layers, the upper layer being oil-poor and the lower layer being oil-rich, and collecting the latter oil-rich layer.

2. The method according to claim 1, wherein a small amount of ethanol contained in the lower layer is removed and then the lower layer is further subjected to a solvent fractionation by dissolving said layer in an organic solvent selected from the group consisting of n-hexane, acetone or methyl ethyl ketone and separating crystalline portion resulting therefrom by filtration.

3. The method according to claim 1, wherein at least a portion of the upper oil-poor layer is recycled without purification thereof for the treatment of new raw shea fat.

4. A hard butter composition consisting esentially of 70% by weight of an intermediate fraction of palm oil and the remaining percent being the shea fat, obtained by the method as set forth in claim 1.

5. The method according to claim 3, wherein about 5 to 20% by weight of the upper oil-poor layer is removed, with the balance being recycled for the treatment of new raw shea fat.

* * * * *